United States Patent [19]
Ito et al.

[11] Patent Number: 5,135,819
[45] Date of Patent: Aug. 4, 1992

[54] PHOTOMAGNETIC MEMORY MEDIUM HAVING A NON-COLUMNAR STRUCTURE

[75] Inventors: Hiroshi Ito; Tsunehiro Tsukagoshi, both of Saitama; Masahiko Naoe, Tokyo, all of Japan

[73] Assignee: Pioneer Electronic Corporation, Tokyo, Japan

[21] Appl. No.: 264,553

[22] Filed: Oct. 31, 1988

[30] Foreign Application Priority Data

Oct. 30, 1987 [JP] Japan .................. 62-275438

[51] Int. Cl.$^5$ .................. G11B 5/66; C23G 14/00
[52] U.S. Cl. .................. 428/694; 204/192.1; 204/192.12; 204/192.13; 204/192.14; 204/192.15; 204/192.2; 360/131; 360/135; 365/122; 369/13; 428/900
[58] Field of Search .......... 204/192.1, 192.12, 192.13, 204/192.14, 192.15, 192.2; 428/694, 900; 360/131, 135; 365/122; 369/13, 14

[56] References Cited

U.S. PATENT DOCUMENTS

| | | | |
|---|---|---|---|
| 3,856,579 | 12/1974 | Allen et al. | 204/192 |
| 4,407,894 | 10/1983 | Kadokura et al. | 204/192.2 |
| 4,576,700 | 3/1986 | Kadokura et al. | 204/192.15 |
| 4,615,954 | 4/1986 | Gardner | 428/332 |
| 4,624,767 | 11/1986 | Obinata | 204/298 |
| 4,710,434 | 12/1987 | Sato et al. | 428/678 |
| 4,737,408 | 4/1988 | Kuwahara et al. | 428/335 |
| 4,751,142 | 6/1988 | Arimune et al. | 428/336 |
| 4,784,739 | 11/1988 | Kadokura et al. | 304/192.2 |

FOREIGN PATENT DOCUMENTS

| | | |
|---|---|---|
| 0139474 | 7/1978 | European Pat. Off. |
| 016404 | 10/1980 | European Pat. Off. |
| 0054269 | 6/1982 | European Pat. Off. |
| 0231672 | 8/1987 | European Pat. Off. |
| 0282836 | 9/1988 | European Pat. Off. |
| 0285668 | 10/1988 | European Pat. Off. |
| 0286132 | 10/1988 | European Pat. Off. |
| 073746 | 5/1983 | Japan . |
| 101721 | 6/1985 | Japan . |
| 012923 | 1/1987 | Japan . |
| 046449 | 2/1987 | Japan . |
| 128547 | 12/1987 | Japan . |
| 1111910 | 5/1968 | United Kingdom . |
| 1358411 | 8/1971 | United Kingdom . |
| 1420061 | 9/1971 | United Kingdom . |
| 1281037 | 5/1972 | United Kingdom . |
| 1390563 | 4/1974 | United Kingdom . |
| 1422519 | 1/1976 | United Kingdom . |
| 1426895 | 3/1976 | United Kingdom . |
| 1458648 | 12/1976 | United Kingdom . |
| 1544612 | 4/1979 | United Kingdom . |
| 2006508A | 5/1979 | United Kingdom . |
| 2043698 | 10/1980 | United Kingdom . |
| 2141864 | 3/1985 | United Kingdom . |
| 2147751 | 5/1985 | United Kingdom . |
| 2169742 | 6/1986 | United Kingdom . |
| 2175160 | 11/1986 | United Kingdom . |
| 2183413 | 6/1987 | United Kingdom . |

OTHER PUBLICATIONS

Naoe et al., "High Rate Deposition of Magnetic Films by Sputtering From Two Facing Targets", J. of Crs y. Growth, vol. 45, Dec. 1978, pp. 361–364.

"Structure of Amorphous TbFeCo Thin Films Prepared by Facing Targets Sputtering", Proceeding of International Symposium on Magneto-Optics, Apr. 1987.

"DC Magnetron-and diode-sputtered polycrystalline...", by M. Hong, et al., Journal of Applied Physics.

"Preparation of High-Coercivity Co-Pt...", by Noae, et al., Journal of Applied Phyics.

Search Rept. for the West German Patent Office.
Search Rept. from British Patent Office.

Primary Examiner—Paul J. Thibodeau
Assistant Examiner—R. Follett
Attorney, Agent, or Firm—Sughrue, Mion, Zinn, Macpeak & Seas

[57] ABSTRACT

A photomagnetic memory medium of an amorphous thin film of a rare-earth transition metal alloy of non-columnar structure deposited on a substrate. In order to achieve the non-columnar structure, the alloy is sputtered in the presence of a plasma but the plasma is confined by a magnetic field so as not to touch the substrate. The alloy is preferably TbFeCo.

8 Claims, 8 Drawing Sheets

- ● : Bp = 220G, Rd = 100 nm/min
- ○ : Bp = 160G, Rd = 100 nm/min
- ◉ : Bp = 220G, Rd = 50 nm/min
- ⊙ : Bp = 160G, Rd = 50 nm/min
- ⦶ : Bp = 120G, Rd = 50 nm/min, Magnetron Sputtering

PHOTOMAGNETIC MEMORY MEDIUM HAVING A NON-COLUMNAR STRUCTURE

FIELD OF THE INVENTION

The present invention relates to a photomagnetic memory medium in the form of an amorphous alloy thin film.

BACKGROUND OF THE ART

Amorphous alloy thin films of rare-earth transition metals have been used in erasable photomagnetic memory media. Especially, an amorphous alloy of terbium, iron, and cobalt (TbFeCo), when it is magnetized, exhibits a reasonable photomagnetic effect and large vertical magnetic anisotropy aligned perpendicularly to the film surface. Thus the amorphous alloy of TbFeCo has been thought of as an advantageous photomagnetic memory material.

Techniques of forming such thin films includes vacuum deposition and sputtering. Particularly, the sputtering is widely used because it produces good adhesion between a substrate and the thin film formed thereon.

Sputtering is a method in which sputtered atoms extracted from a solid into space due to exchange of momentum build up on a substrate when the accelerated particles impinge the surface of the solid and thus form a solid.

The TbFeCo amorphous alloy thin film obtained by, for example, a magnetron sputtering apparatus as shown in FIG. 13 is formed of an initial layer and a columnar crystal net, and fine particles (FIG. 7). This magnetron sputtering apparatus is a diode sputtering apparatus whose sputtering source is modified. As shown in FIG. 13. a magnet 8 is disposed under a target 5 to form a tunnel-shaped magnetic field of 0.02 to 0.05 T (200 to 500 gauss). Electrons e are trapped within the magnetic field and then turn in a spiral fashion above the target 5 along the magnetic field to produce an Ar gas plasma. The particles of the Ar plasma collide with the target to produce the sputtered atoms. Formation of a columnar crystal structure of TbFeCo film by sputtering has not yet been fully explained. It is generally thought that this film is of the Volmer-Weber type. The columnar crystal growth is considered to occur around nuclei produced at an adsorption site having a large adsorption energy of atoms due to motion of the sputtering atoms on the surface of the substrate. The number of sites is much less than the number of the surface atoms. Thus, the structure of the thin film is island-like or patch-like at an early stage of deposition of thin film (FIG. 12(a)). If the substrate is amorphous, then the surface having the highest density of crystal is parallel to the surface of the substrate in many cases. If every grain boundary extends from the substrate to the top surface of the film, then a columnar crystal structure is produced. When the width of the island grows to contact adjacent islands, lateral growth of the island stops (FIG. 12(b)). Although side surfaces of the islands are usually different from each other, it is difficult for realignment to occur if the mobility of the condensed sputtered atoms is small Thus the grain boundaries are formed as they are. The sputtered atoms are considered to arrive from the space above the islands in view of the fact that there are gaps between the islands, but the Ar discharge gas atoms are actually scattered in random directions. Therefore, the number of sputtered atoms that are incident in directions oblique to the normal direction to the substrate will increase. These islands disturb the atoms which would otherwise go into shadowed portions of the islands or gaps between the islands (shadowing effect). In view of this effect, taller portions of the islands grow disproportionately to thereby form columnar crystal (FIG. 12(c)). Consequently, the ratio of the number of atoms of discharge Ar gas to the number of the sputtered atoms increases to eventually increase the number of atoms of the discharge Ar gas which are captured by the grain boundary, thereby producing voids in addition to the ordinary grain boundaries. Reference is made to "Sputtering Phenomena" by Akira Kanahara, Tokyo University Publishing Committees.

The following factors are considered to contribute to formation of the columnar crystal structure.

1) Thin film growth is of the Volmer-Weber type.
2) Fibrous structure or epitaxial orientation growth occurs easily and grows rapidly in a particular direction.
3) Migration and diffusion of the condensed sputtered atoms are reasonably small.
4) The atoms arrive at the substrate in random directions due to the discharge gas atoms to cause shadowing effect.

A unit of thin film columnar crystal structure formed due to the above factors is considered to contribute to cause the photomagnetic effect and the magnetic anisotropy in which magnetization of the thin film is aligned perpendicularly to its surface.

In the case where the photomagnetic memory layer is formed by an amorphous alloy thin film having such columnar crystal structure, the photomagnetic property is still not enough for photomagnetic memory medium. Thus, the photomagnetic memory property is improved by adding other elements to the alloy for a multi-element film, or providing a protective film having an enhancing effect over the alloy film for multilayer construction. Although amorphous alloy thin films of such rare-metal transition metals have been studied, their fine structure of the thin film, and chemical, magnetic, and magnetooptics property, the photomagnetic memory medium having adequate CN ratio in practice has not been developed yet. Additionally, since a rare-metal transition metal is easily oxidized, the photomagnetic property thereof has not been sufficiently stable.

SUMMARY OF THE INVENTION

An object of the present invention is to provide an optical magnetic memory medium having good photomagnetic characteristics and environmental stability.

A photomagnetic memory medium according to the present invention is characterized in that the memory medium has a photomagnetic thin film having a non-columnar structure and composed of an amorphous rare-earth transition metal alloy. With a photomagnetic memory medium according to the present invention, there is formed on a substrate a thin film of the amorphous alloy having a non-columnar structure or a structure which has generally consistent density and less surface relief.

BRIEF DESCRIPTION OF THE INVENTION

Figure 4A:
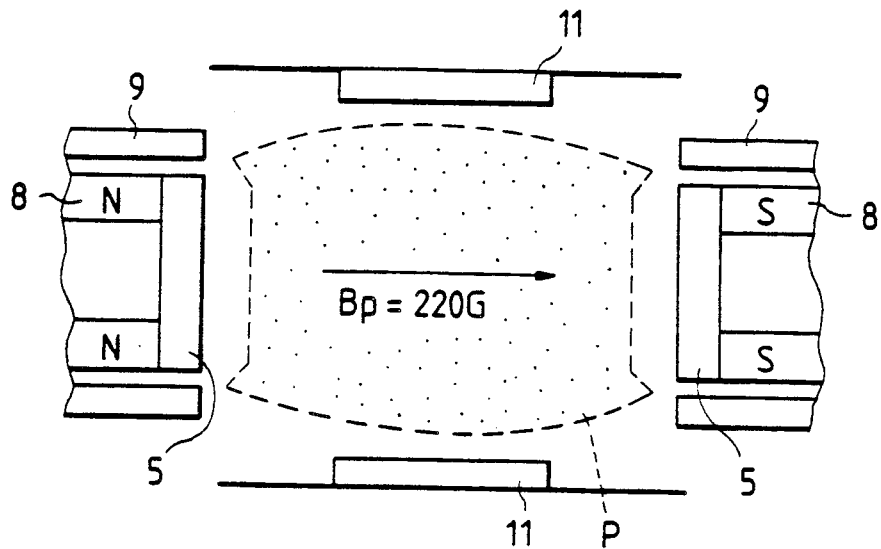
Figure 4B:
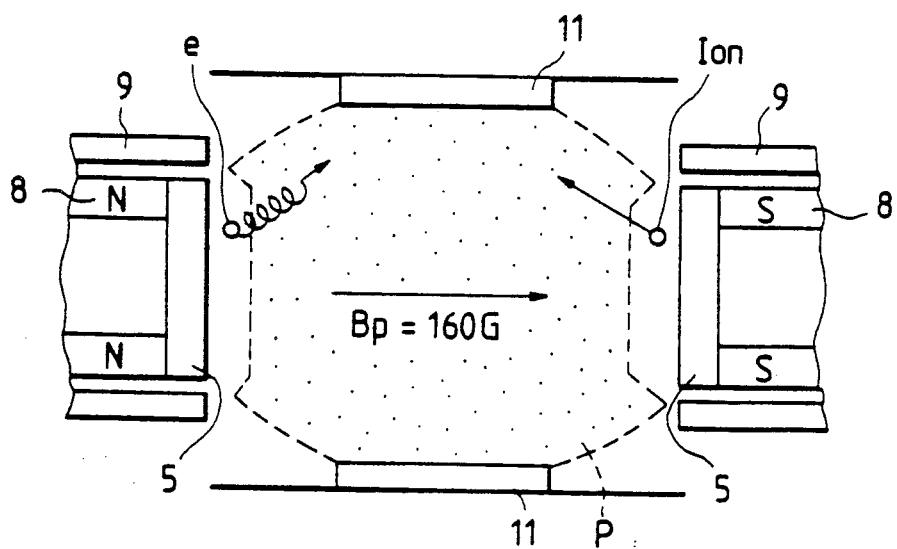
Figure 5:
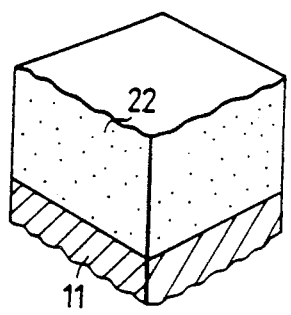
Figure 6:
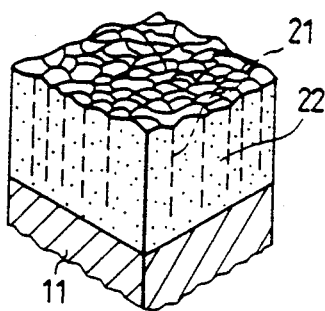
Figure 7:
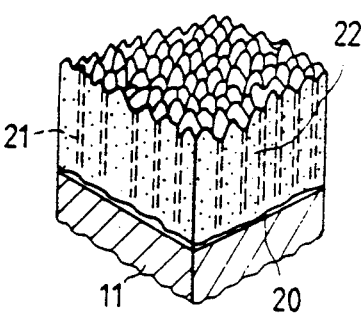
Figure 8A:
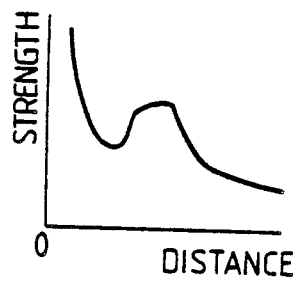
Figure 8B:
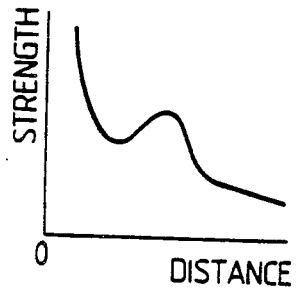
Figure 8C:
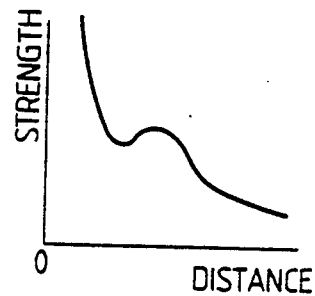
Figure 9A:
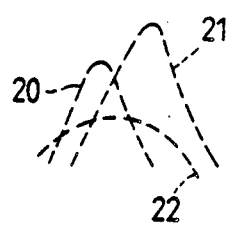
Figure 9B:
Figure 9C:
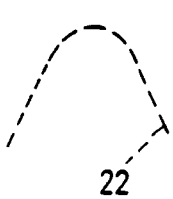
Figure 10:
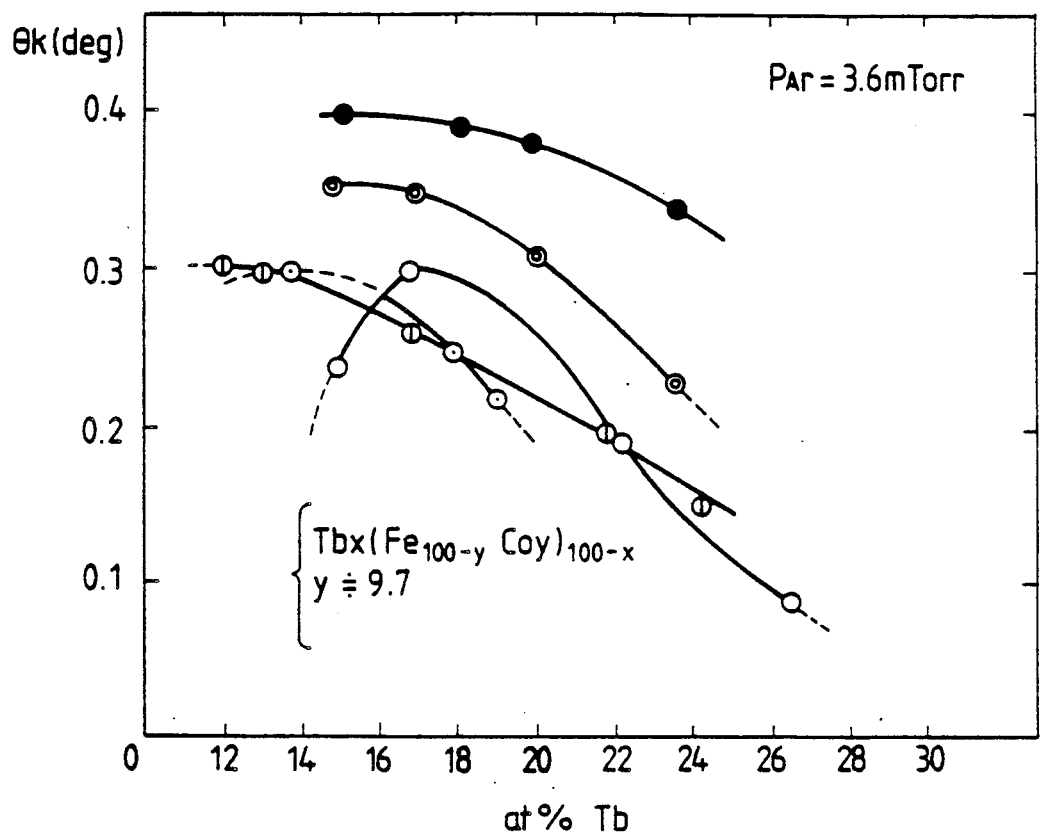
Figure 11:
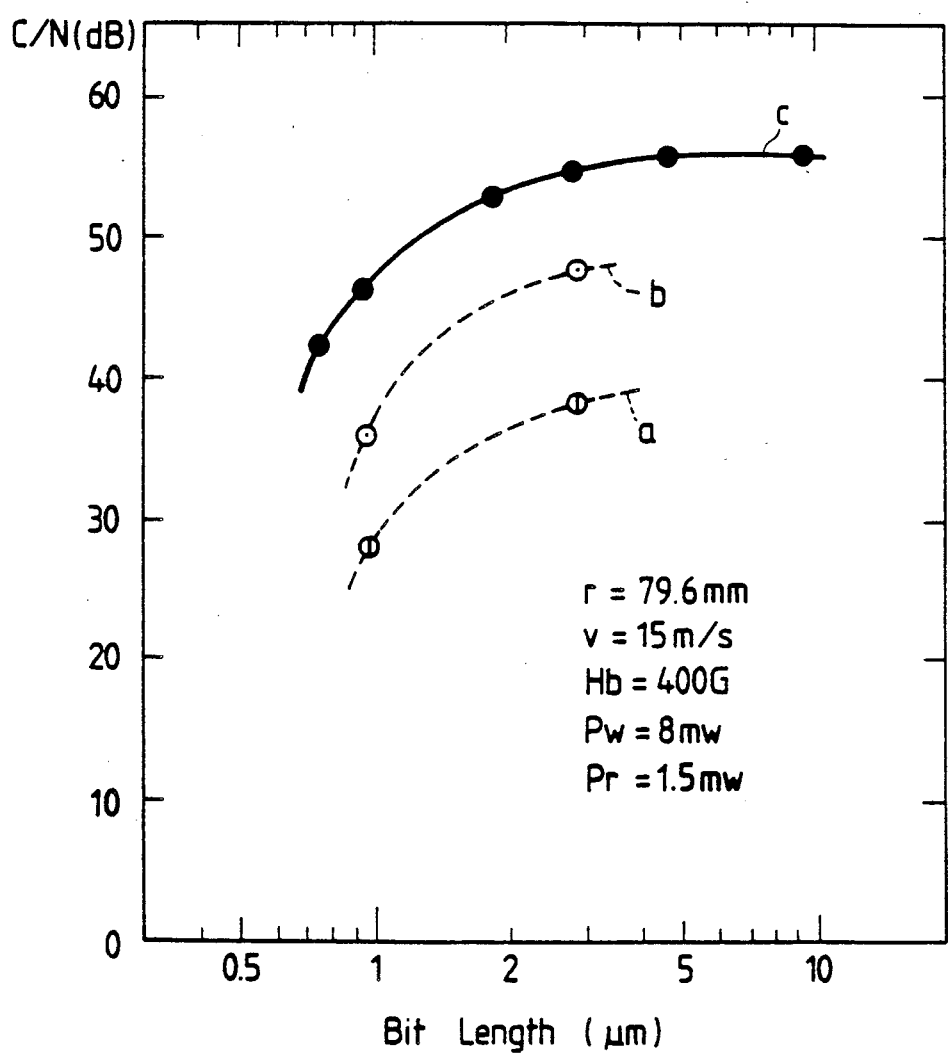
Figures 12A, 12B, 12C:
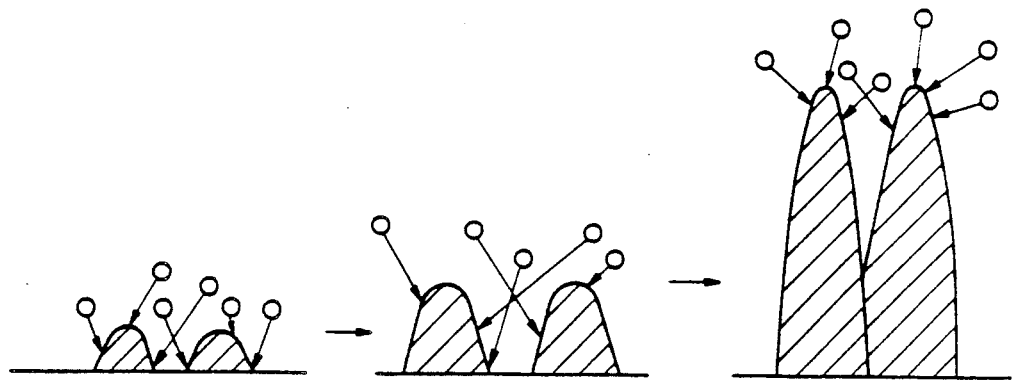
Figure 13:
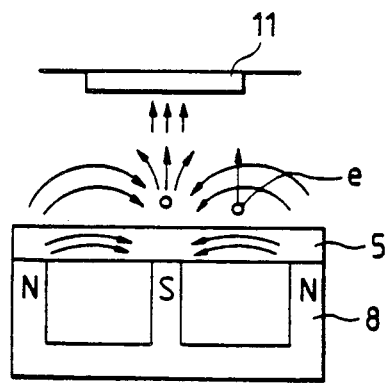

FIG. 4(a) and FIG. 4(b) are general cross sectional views for showing operation of the counter target sputtering apparatus according to the present invention;

FIG. 5 is a general partial expanded perspective view of a photomagnetic memory medium according to the present invention;

FIG. 6 and FIG. 7 are general partial expanded perspective views of the conventional photomagnetic memory medium;

FIG. 8(a) is a graph obtained by a microdensitometer for showing the fine structure of an amorphous alloy thin film obtained by a magnetron sputtering apparatus, and FIG. 8(b) and FIG. 8(c) are graphs obtained by a microdensitometer for showing the fine structure of an amorphous alloy thin film obtained by the magnetron sputtering apparatus;

FIG. 9(a) to FIG. 9(c) are expanded views of the peak portions in FIG. 8(a) to FIG. (c);

FIG. 10 is a graph showing change in Kerr rotational angle of the photomagnetic memory medium versus amount of terbium contained in a thin film;

FIG. 11 is a graph for showing a change in CN ratio of the photomagnetic memory medium versus length of a bit;

FIG. 12 is a general cross sectional view for illustrating steps of growth of an amorphous alloy thin film through sputtering;

FIG. 13 is a general cross sectional view for showing operation of the magnetron sputtering apparatus.

DETAILED DESCRIPTION OF THE INVENTION

Figure 1:
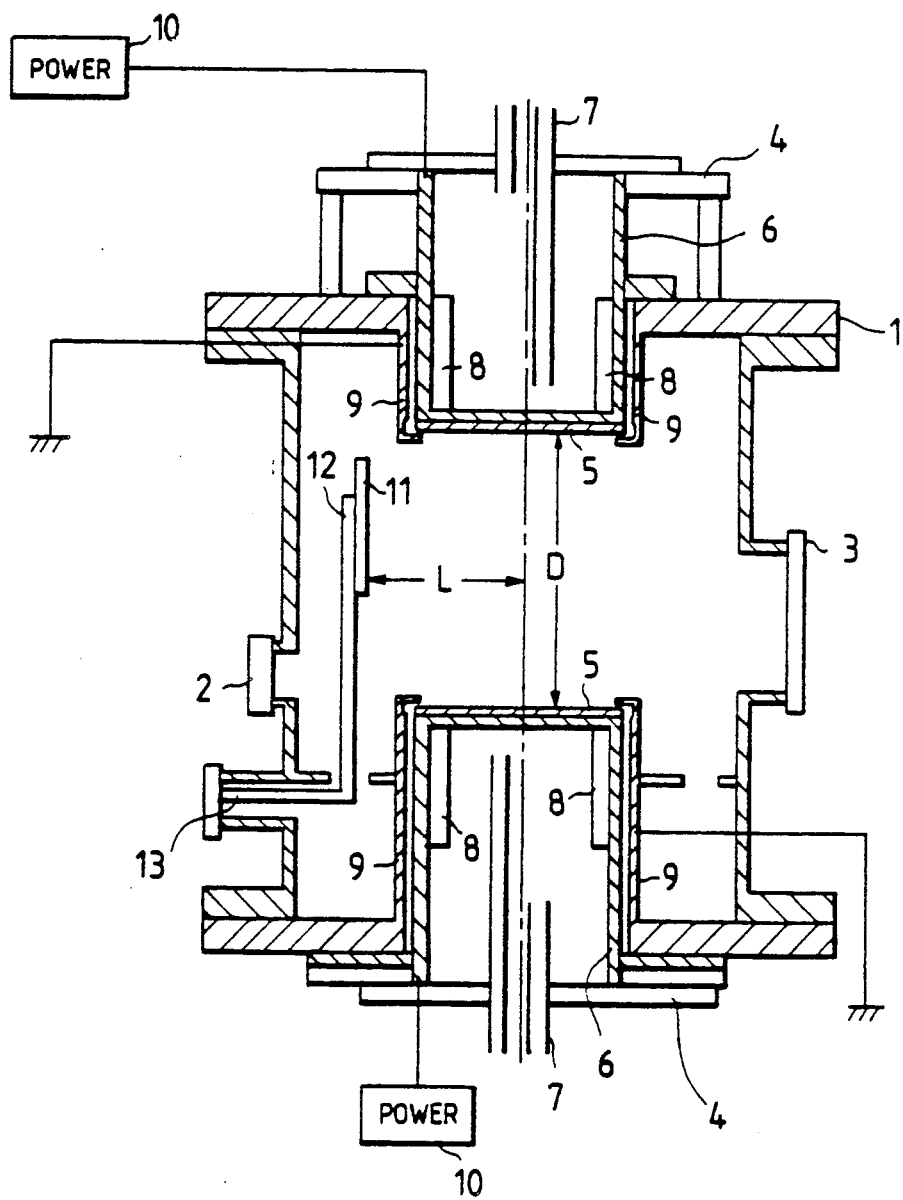
FIG. 1 is a general cross sectional view of a counter target sputtering apparatus according to the present invention.

The applicant of the invention has found in an experiment that while such a thin film of an amorphous alloy of a non-columnar crystal structure lacks the columnar structure, it has sufficient photomagnetic effect and vertical magnetizing characteristics as well as adequate environmental stability. Such a non-columnar crystal structure in a thin film of amorphous alloy is obtained through a counter target type sputtering apparatus as shown in FIG. 1. Such an apparatus is formed of a hollow circular cylindrical container which is closed at both ends to define a space within This container is provided at its side wall with a path 2 for supplying an inert gas such as Ar, a vacuum pump for producing negative pressure therewithin, and an exhaust path 3 communicating with a diffusion pump. Two sputtering sources 4 are formed of two hollow cylindrical members 6, end portions of which supports two targets 5, side plates 1 and supply port 7. The hollow cylindrical members 6 are provided with a coolant path for circulating water for cooling. The targets 5 are secured to the sputtering source 4 and are disposed in parallel to each other with a distance D therebetween.

A hollow cylindrical permanent magnet 8 is provided on the inner wall of each hollow cylindrical member 6 near the target 5. Each of the permanent magnets 8 confronts the other with the opposing two targets 5 in between in such a way that the polarity of one magnet is opposite to that of the other. Around the sputtering sources 4 are provided two anodes 9 which are insulated from the targets 5 and are grounded. The hollow cylindrical members 6 and the targets 5 are applied with negative potential from respective external power supplies 10. The shape of the hollow cylindrical member 6 is modified to have a square cross section if the target 5 is a square target. Accordingly, the permanent magnet 8 within the member 6 is also shaped to have a square cross section. If the target 5 is circular, then the hollow cylindrical member 6 and the permanent magnet 8 are shaped to have corresponding circular cross sections.

A substrate holder 12 is disposed in such a way that a substrate 11 is positioned at a distance L from the center axis of the opposing targets 5 in parallel to this axis and the flat surface of the substrate 11 faces the space between the two targets 5. Also, the substrate holder 12 is provided with a path 13 for circulating fluid to cool the substrate.

Figure 2:
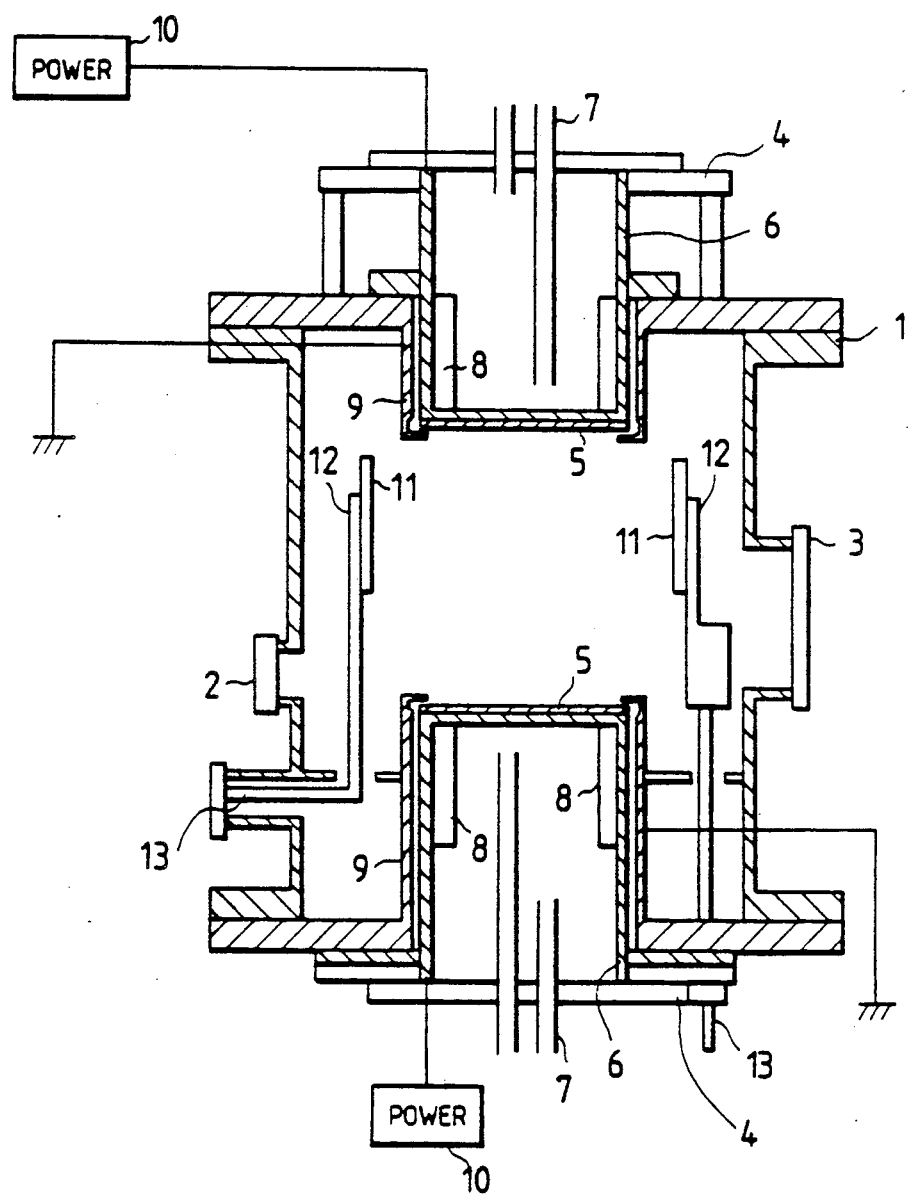
FIG. 2 and FIG. 3 are general cross sectional views of another embodiment of n counter target sputtering apparatus according to the present invention.

Another way of disposing the substrate holder 12 is shown in FIG. 2, in which a plurality of substrates 11 and the substrate holders 12 are disposed around the space defined between the sputtering sources 4 so that the flat surfaces of the substrates 11 confront the magnetic flux.

Figure 3:
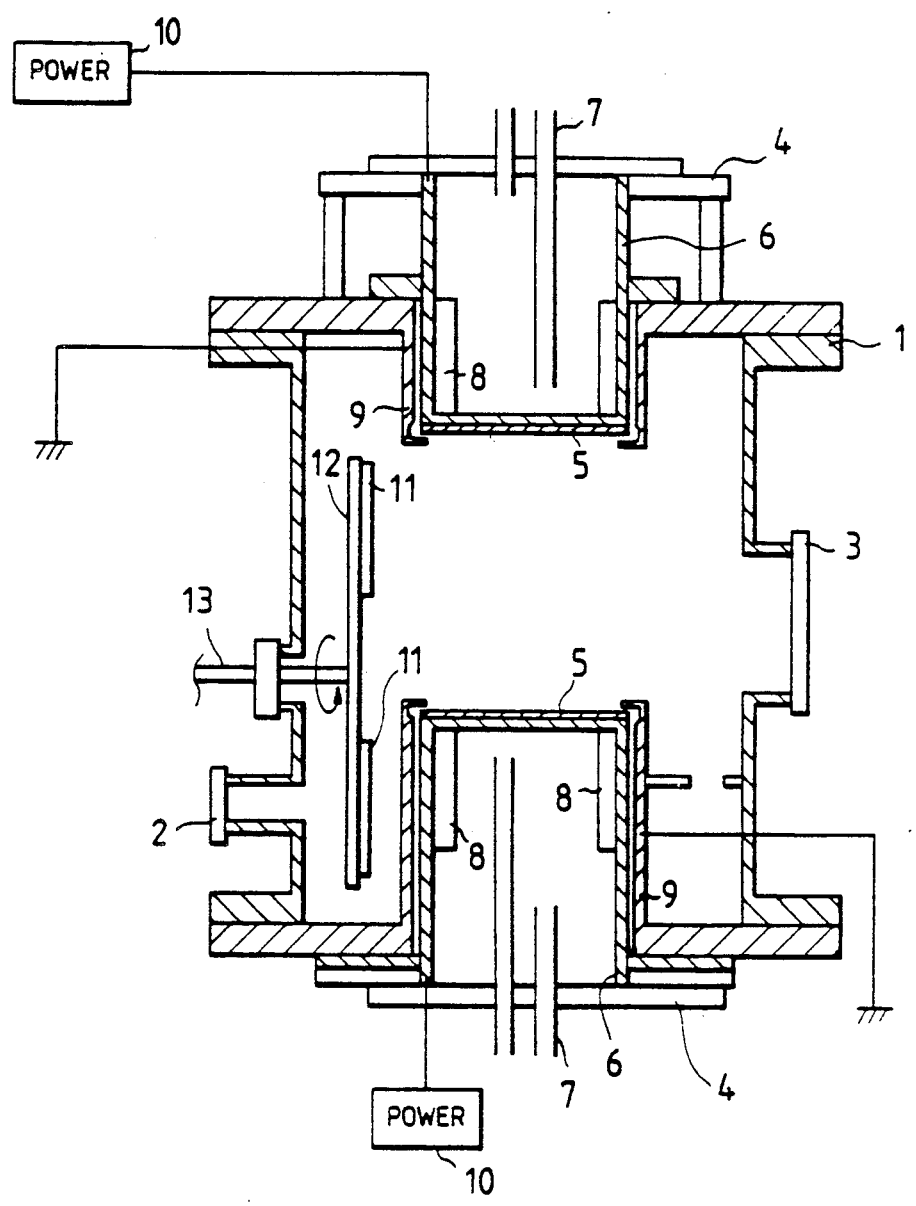

Further, the substrate holder 12 may be a rotatable disk as shown in FIG. 3. In this case, a plurality of substrates are mounted on the substrate holder 12 and the holder 12 rotates so that the substrates 11 are sequentially exposed to the sputter vaporization. In this manner, it is also possible to dispose a large number of substrates for film production.

With the counter target type sputtering apparatus thus far described, the permanent magnets 8 provide a sufficiently strong magnetic force. For example, the magnetic field intensity at the midpoint between the two magnets along the center axis of the permanent magnets 8 is selected to be 220 gauss. By designing the magnetic force of the permanent magnet 8 to be strong, a plasma P, as shown by a broken line in FIG. 4(a), produced in the space between the opposing targets 5 will converge in the space and will not reach the substrates 11 in a process called plasma convergence. Thus, only sputtered atoms extracted from the targets 5 will build up on the surface of the substrate 11 so that the thin film will grow on the substrates 11. Arranging the substrate to be plasma free in this manner will not allow plasma particles to mix in the deposited sputtered atoms when the sputter atoms build up, thereby producing uniform quality through out the deposited layer or the thin film. Further, heating of the substrate and deposit layer due to γ electrons etc., in the plasma particles is prevented thereby ensuring a minimum temperature rise of the substrate. Thus, the sputter rate may be increased as well as plastic substrates having low heat resistance may also be used. Additionally, while the sputter rate has a substantially positive correlation with respect to the power supplied between the target and the anode, and substantially negative correlation with respect to the Ar gas pressure, lower Ar gas pressures can still produce emission of the sputter atoms with the same amount of supplied power, thereby permitting higher sputtering rates for the same amount of supplied power supplied to improve efficiency. On the contrary, in the case where the permanent magnets 8 are designed to have a weaker magnetic force so that the magnetic field intensity around a mid portion of the central axis of the magnets is 160 gauss, the plasma will not adequately converge, and will reach the substrates 11 as shown by the broken line in FIG. 4(b). Accordingly, the magnetic field intensity should be greater than 160 gauss, but not greater than 220 gauss in order to provide the magnetic field intensity shown in FIG. 4(a). Thus, plasma particles such as Ar will mix in the deposited layer to disturb the formation of the uniform thin film. Further, the substrates will be heated up by γ electrons etc., thereby not permitting high rate of sputtering.

In the present invention, the sputtering rate is selected to be sufficiently high, for example 100 nm/min, to obtain an amorphous alloy thin film of non-columnar structure. Such high rate of sputtering can encourage build up of the sputtered atoms one after another while the kinetic energy of the sputtering atoms is large. Thus, the formation of columnar crystals is disturbed by vibration of atoms in the deposited layer. The fine structure of the amorphous alloy thin film of non-columnar structure made by the present invention is such as the one shown in FIG. 5. That is, a thin film not having large surface irregularities will be produced on top of the substrate 11 on which fine particles 22 of the alloy is uniformly distributed.

On the contrary, the film structure of a conventional amorphous alloy thin film which is obtained through a magnetron sputtering apparatus has a columnar structure such as shown in FIG. 7, whose size of surface irregularities is in the order of, for example, several nanometers in height.

Furthermore, the counter target sputtering apparatus is not guaranteed to be plasma free as shown in FIG. 4(b) in the area of the substrates. The fine structure of the thin film which is obtained while being exposed to the plasma still has surface irregularities of the order of several nanometers. Also, the resultant density is not uniform. The thin film obtained by the conventional magnetron sputtering apparatus is shown in FIG. 7 consists of an initial layer 20 over the substrate 11, a columnar crystal net 21, and fine particles 22. The fine particles 22 are relatively large in size and have a non-uniform relief structure on the surface. Also, the thin film obtained while being exposed to plasma is shown in FIG. 6 and is formed of the columnar crystal net 21, the fine particles 22 but does not have the initial layer. On the other hand, the thin film obtained in plasma free condition is shown in FIG. 5 and does not have the columnar crystal structure but has a non-columnar crystal structure consisting of only the fine particles 22, which are very small in size. It was found that an amorphous thin film with no columnar structure produced at a high sputtering rate on a plasma-free substrate has a high CN ratio and effectively resists corrosion.

Also, since the film has no columnar structure, the surface condition of the film is more uniform, ensuring the least decrease of the Kerr rotational angle due to laser light, etc. Further, the decreased unit surface area decreases the change of reaction due to contact with air to improve the weatherproofness. With the counter target apparatus, impingement of ions or impingement of γ electrons against the growing film is limited by effective plasma convergence. In this manner, the counter target sputtering apparatus will provide a plasma free condition, namely, a condition in which the plasma is confined between a pair of counter targets by magnetic field. Therefore, the substrate is not exposed to the plasma, and thus the film formation can be accomplished on a substrate at a low temperature and at a high sputtering rate. The TbFeCo thin film produced by the counter target sputtering apparatus has an amorphous structure of high density and columnar structure. This film is capable of being magnetized vertically on the film surface. Convergence of the plasma by the counter target sputtering apparatus can easily be controlled by adjusting the magnetic field as shown. Reasonable convergence of plasma can produce a uniform and stable thin film of the TbFeCo without clear columnar crystal structure on a substrate under plasma free condition.

According to the present invention thus far described, by virtue of photomagnetic memory layer having an amorphous rare-earth transition metal photomagnetic thin film, a photomagnetic memory medium can be obtained with a high CN ratio and which is weatherproof.

Experiments were made using a conventional magnetron sputtering apparatus and a counter target sputtering apparatus under the sputtering conditions shown in FIG. 1 and Table 2 to compare (1) fine structure, (2) weatherproofness, and (3) optomagnetic property of the TbFeCo thin film produced at various sputtering rates and magnetic field intensities. Also, the experiments determined (4) the read/write characteristics of a photomagnetic disk made of this TbFeCo thin film. The data for the film produced by the magnetron sputtering apparatus are sample data for comparison with the data of the invention.

TABLE 1

| | |
|---|---|
| Residual gas pressure $P_B$ | $7 \times 10^{-7}$ Torr |
| Argon gas pressure $P_{Ar}$ | 3.6 mTorr |
| Applied voltage | 280 V–430 V |
| Discharge current | 1.4 A–2.7 A |
| Applied power | 392 W–1161 W |
| Sputter rate $R_d$ | 50 nm/min–100 nm/min |

TABLE 2

| | Conventional magnetron sputtering apparatus | Counter target sputtering apparatus | |
|---|---|---|---|
| | | plasma exposed | plasma free |
| $P_B$ (Torr) | $1 \times 10^{-7}$ | $1 \times 10^{-6}$ | $7 \times 10^{-7}$ |
| $P_{Ar}$ (Torr) | 6 | 5 | 3.6 |
| $R_d$ (nm/min) | 50 | 50 | 100 |
| $B_p$ (gauss) | 120 | 160 | 220 |
| target | dual | composite | composite |

Each of the counter targets was formed of an $Fe_{90}Co_{10}$ alloy plate and a pure Tb strip to form a composite target. The targets were of rectangular shape, 100 mm wide, 160 mm long, and 5 mm thick. The distance D between the targets is 150 mm and the location L of the substrate was 75 mm.

Composite target or alloy targets of TbFe, GdTbFeCo, and GdFeCo as well as a composite target of the TbFeCo can also be used for sputtering. Unlike the magnetron sputtering apparatus, the magnetic field intensity $B_p$ applied perpendicularly to the respective target surfaces was varied to 160 gauss and 220 gauss, respectively, by replacing the permanent magnets for forming the convergent plasma between targets. A substrate holder was maintained at a floating potential. The substrate was made of flex glass plate and a glass plate having guide grooves of a diameter of 12 inches.

A thin film of $Tb_x(Fe_{100-y}Co_y)_{100-x}(y=9.7)$ was formed as determined by fluorescent X-ray diffraction.

A transmission electron micrograph (TEM) and selective area electron diffraction (SAED) pattern were observed by a JEM-200 FX electron microscope set with an acceleration voltage of 200 kV and a resolution of 0.14 nm. These patterns were converted into a standard x-y format by a microdensitometer. The reflection coefficient R. Kerr rotational angle k, and coercive force $H_c$ were determined by a laser of a wavelength of 830 nm with an external magnetic field of 15 kOe at ambient temperature. The weatherproof test was conducted by exposing the obtained TbFeCo thin film in air for 250 days. Further, a laser of a wavelength of 830 nm was used for testing the read-write characteristics of the photomagnetic disk made of TbFeCo thin film. In the discussions below, the notations (a), (b), and (c) denote the TbFeCo thin film obtained by the magnetron sputtering apparatus with the substrate exposed to plasma, the counter target sputtering apparatus with substrate exposed to plasma, and the counter target apparatus with plasma free condition, respectively.

The respective thin film SAED patterns show that all the thin films obtained are amorphous. Such an SAED pattern was converted into the standard x-y format by a microdensitometer to obtain the graphs as shown by FIGS. 8(a), 8(b), and 8(c) corresponding to the respective thin films. It should be noted that the peaks become gradually less pronounced in the order of (a), (b), and (c) and the columnar crystal does not exist in (c). FIG. 9 shows resolved and magnified views of the general shapes of the peaks in FIG. 8. The reference numerals of the respective curves denote the structure of the thin film or the initial layer 20, the columnar crystal net 21, and the fine particles 22.

A substrate having a thin film of 170 nm thickness of alloy composition $Tb_{19.1}(Fe_{90.3}Co_{9.7})_{80.9}$ was produced by the counter target sputtering apparatus under the condition of an argon gas pressure $P_{Ar}$ of 3.6 mTorr, a sputter rate $R_d$ of 100 nm/min, and a magnetic field intensity $B_p$ of either 160 gauss or 220 gauss at the midpoint between targets. Then the thin film thus produced was subjected to the weatherproof test, in which the thin film was exposed to air for 250 days. After the test, the reflection coefficient decreased by 4% but the Kerr rotational angle of about 0.28 degrees and coercive force of about 12 kOe remained unchanged. The thin film was also subjected to an atmosphere of 90% RH and 50° C. for 150 minutes. Although the reflection coefficient decreases gradually, the Kerr rotational angle and the coercive force remained almost constant, being immune to atmosphere of water vapor and oxygen.

FIG. 10 shows how the Kerr rotational angle $\theta_k$ is dependent upon the Tb component in the thin film. The Kerr rotational angle was measured with a laser of a wavelength of 830 nm.

The thin film of a composite of TbFeCo was produced by the counter target sputtering apparatus with $P_{Ar}$ equal to 3.6 Torr, and further by setting the sputtering rate $R_d$ equal to either 50 or 100 nm/min and a magnetic field intensity $B_p$ equal to either 160 or 220 gauss. The Kerr rotational angle $\theta_k$ at sputtering rates of 50 and 100 nm/min increases with increasing intensity of the magnetic field applied. This implies that producing the thin film on a substrate in a plasma free condition is important in obtaining a large Kerr rotational angle.

The thin film produced at a sputtering rate $R_d$ of 100 nm/min on the substrate in a plasma free condition showed Kerr rotational angles as large as 0.37 degrees. These Kerr rotational angles shown in FIG. 10 decrease gradually with increasing Tb component. The thin film obtained at the magnetic intensity $B_p$ of 220 gauss in plasma free condition and the sputtering rate $R_d$ of 100 nm/min exhibits less decrease of Kerr rotational angle as compared to that obtained at a sputtering rate $R_d$ of 50 nm/min, which shows a much larger dependence upon the Tb component. Thus, the thin films having stable characteristics can still be obtained even if the Tb component is mixed.

A photomagnetic disk was made of the TbFeCo thin film thus obtained and its CN ratio was examined under a test condition of a read-out power of 1.5 mW, a write power of 8.0 mW, a bit length of 0.8 to 1.0 μm, an external magnetic field of 400 gauss, and a linear velocity of 15 m/sec at a position of a radius of 79.6 mm. The dependence of the CN ratio on the bit length when the thin film is formed as a photomagnetic disk is shown by the graphs in FIG. 11. In FIG. 11. the plots b and c show the photomagnetic disks made by the counter target sputtering apparatus, the curve c being a plasma free disk made with a substrate that was not exposed to a plasma, and the curve b being a disk made of a substrate exposed to the plasma. The curve a is a disk made of the conventional magnetron sputtering apparatus. It is apparent that the photomagnetic disk, especially those made of a substrate under the plasma free condition exhibits a high CN ratio of 57 dB at a bit length of 5 μm, which is 8 dB higher than the curve b for the substrate exposed to plasma. FIG. 11 shows that the Kerr rotational angle of the optomagnetic memory layer is markedly increased by virtue of the plasma free condition. Thus, it is apparent that the substrate should be processed under plasma free condition for an improved CN ratio of the photomagnetic disk.

What is claimed is:

1. A memory medium comprising a support and a photomagnetic thin film deposited on said support, said thin film comprising an amorphous rare-earth transition metal alloy having a non-columnar structure, wherein said alloy has a composition of $Tb_x(Fe_{100-y}Co_y)_{100-x}$ and wherein y approximately equals 9.7 and x is within a range of 14 to 24.

2. A method of forming a photomagnetic memory medium, comprising the steps of:
   placing a plurality of substrates and at least one target within a vacuum deposition chamber, said at least one target comprising materials selected to form a rare-earth transition metal alloy;
   creating a plasma within said deposition chamber;
   imposing a magnetic field within said chamber of a direction and a strength such that said plasma does not touch said substrates, said magnetic field having an intensity which is greater than 160 gauss, but not greater than 220 gauss; and
   sputtering said materials from said at least one target to deposit on a surface of said substrates to form a thin film.

3. A method as recited in claim 2, wherein said materials are deposited on said substrates at a rate of 50 to 100 nm/min.

4. A method as recited in claim 2, wherein two targets are placed in said vacuum chamber with two major faces thereof facing each other, wherein said magnetic field extends substantially perpendicular to said two major faces, and wherein said surface of said substrates are substantially parallel to an axis between said two major faces.

5. A method as recited in claim 4, wherein said magnetic field is imposed by two magnets of opposite polarity placed on sides of said targets opposite said two major faces.

6. A method as recited in claim 5, wherein said materials are deposited on said substrate at a rate of 50 to 100 nm/min.

7. A method as recited in claim 2, wherein said placing step includes providing a plurality of holders for supporting the plurality of substrates, respectively.

8. A method as recited in claim 2, wherein said placing step includes providing a single rotatable holder for supporting said plurality of substrates.

* * * * *